United States Patent [19]

Polos

[11] 4,432,683

[45] Feb. 21, 1984

[54] TOGGLE BOLT ASSEMBLY

[76] Inventor: Constantine D. Polos, 524 Williamsburgh, Glen Ellyn, Ill. 60137

[21] Appl. No.: 391,121

[22] Filed: Jun. 23, 1982

Related U.S. Application Data

[63] Continuation of Ser. No. 144,529, Apr. 28, 1980, abandoned, which is a continuation-in-part of Ser. 928,107, Jul. 26, 1978, abandoned.

[51] Int. Cl.³ .............................................. F16B 35/04
[52] U.S. Cl. .................................... 411/340; 411/342; 411/411; 411/438
[58] Field of Search ................................ 411/341–345, 411/346, 262, 392, 386, 387, 411, 412, 438, 424, 411,392

[56] References Cited

U.S. PATENT DOCUMENTS

| 2,745,457 | 5/1956 | Lang | 411/262 |
| 2,777,718 | 1/1957 | Vegren | 411/438 |
| 3,782,238 | 1/1974 | Polos | 411/345 |
| 4,318,651 | 3/1982 | Ragen | 411/392 |

FOREIGN PATENT DOCUMENTS

| 1402079 | 5/1965 | France | 411/438 |
| 216380 | 2/1967 | Sweden | 411/340 |
| 408608 | 4/1934 | United Kingdom | 411/438 |
| 606902 | 8/1948 | United Kingdom | 411/392 |
| 1187837 | 4/1970 | United Kingdom | 411/342 |

Primary Examiner—Gary L. Smith
Assistant Examiner—Neill Wilson
Attorney, Agent, or Firm—Merriam, Marshall & Bicknell

[57] ABSTRACT

A toggle bolt assembly has a solid toggle head which is threadedly mounted on a cylindrical helical coil spring coaxially attached to the end of a threaded bolt, the coils of the spring having an outer diameter and a pitch which correspond substantially to those of the threads of the bolt, so that the spring forms a flexible extension of the threads of the bolt. With the toggle head mounted on the spring near the free end thereof, the spring can easily be bent to position the toggle head adjacent the bolt and substantially parallel thereto, thus permitting the entire assembly to be passed through an opening in the member in which it is to be installed. As soon as the toggle head has passed entirely through the hole, the resiliency of the spring causes it to straighten out, thus positioning the toggle head across the opening on the blind side of the hole. By maintaining the toggle head in contact with the rear surface of the member while rotating the bolt, the helical coils of the spring will guide the bolt into engagement with the toggle head, thus permitting the assembly to be tightened in conventional fashion.

6 Claims, 11 Drawing Figures

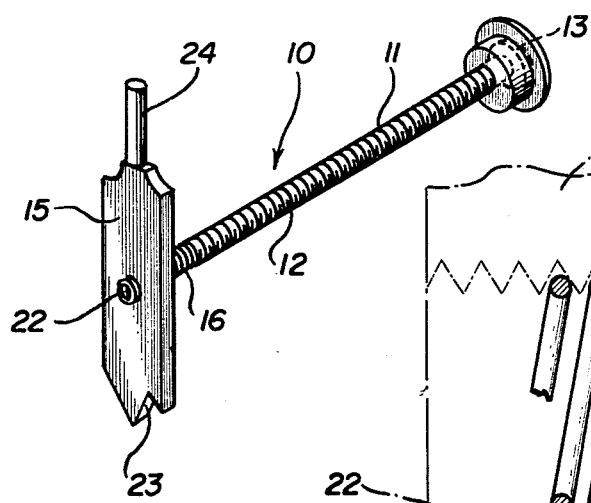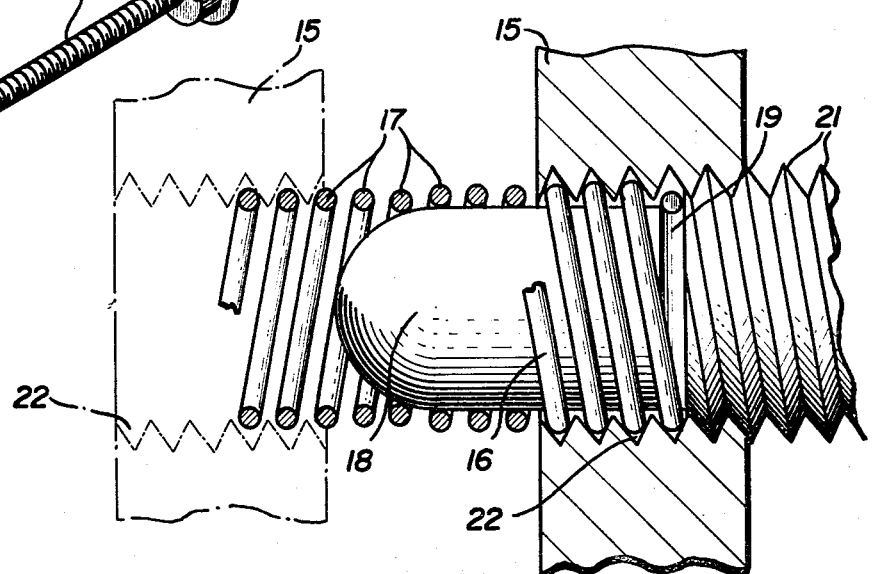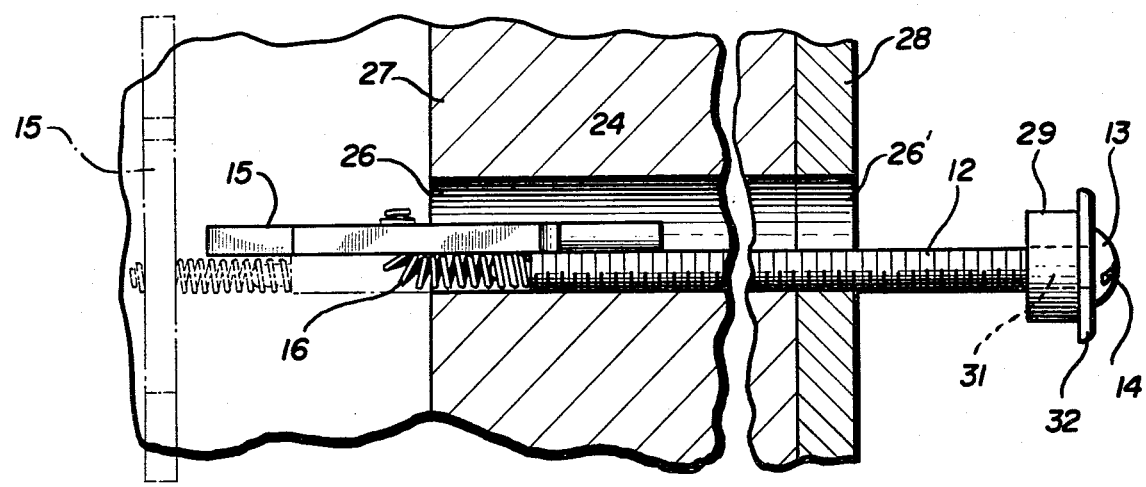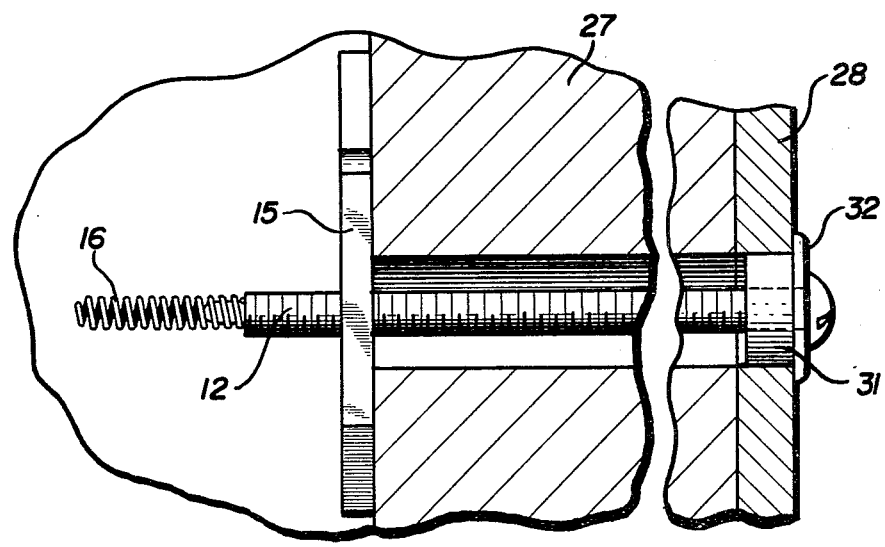

TOGGLE BOLT ASSEMBLY

This application is a continuation of my application Ser. No. 144,529, filed Apr. 28, 1980, which in turn is a continuation-in-part of my copending application, Ser. No. 928,107, filed July, 26, 1978, both now abandoned.

This invention relates to fasteners and more particularly to fasteners of the toggle bolt type which are used to attach an object to a surface when access to the rear of the surface is restricted, as in the case of hollow walls and ceilings.

BACKGROUND OF THE INVENTION

A well-known toggle bolt assembly consists of a threaded bolt on which is mounted a threaded toggle head including a pair of spring-loaded wings, each of which can be folded to a position parallel to the bolt, thereby permitting the toggle head to be passed through a hole in the surface on which an attachment is to be made. After passing through the hole, the spring-loaded wings spring outwardly away from the bolt to a position approximately perpendicular to the bolt. The total length of the extended wings is greater than the diameter of the hole through which the folded toggle head was inserted, so that the toggle assembly cannot be pulled out of the hole. By rotating the bolt on which the toggle head is mounted, a firm attachment of a desired object, previously positioned between the toggle head and the head of the bolt, can be made to the surface. The relatively complex construction renders toggle bolt assemblies of the type described expensive and also limited in load carrying capacity because of a tendency to fail at the articulated joints which are present therein.

A toggle bolt assembly in which the toggle head is of solid construction, without the joint necessary in the folding wing type, would be not only stronger, but more reliable and less costly than the folded wing construction. The design of such an assembly, however, presents obvious difficulties. Although an elongated head can be passed axially through the opening in which the fastener is to be installed, once through the hole it must be reoriented in a transverse position spanning the hole and in position to engage the threads of the bolt with which it is to be used. The problem is, of course, aggravated by the fact that access to the rear surface of the member in which the fastener is to be installed is generally not available.

Several toggle bolt assemblies employing a solid, i.e., non-articulated, head are known, all of which have some shortcomings.

In Italian Pat. No. 493,279, granted July 23, 1953, the end of the bolt is provided with a hook on which the solid toggle head is suspended. A flexible braid attached to the head and extending through the hole in the workpiece is used to pull the head into contact with the threads on the bolt in order to permit engagement of the bolt with the head. The need for manipulation of the braid in order to secure engagement between the bolt and the nut, and the possibility that the braid might break or become fouled with the workpiece, represent disadvantages of this type of construction.

In U.S. Pat. No. 3,175,452, there is proposed a flexible extension on the end of the bolt on which an elongated nut or toggle head is positioned during installation of the assembly. The extension is bent at approximately right angles to permit the elongated head or nut to pass through an opening in the workpiece. After passing through the opening, the inherent resiliency of the extension positions the toggle head across the opening. The extension is in the form of a thin strip having the same diameter as that of the bolt and threaded along its edges with threads corresponding to those on the bolt. One problem encountered with this type of construction lies in the difficulty encountered in fastening the thin end of the extension, typically formed of a resilient plastic material, to the end of the bolt. In addition, the small area of contact between the threads of the toggle head and the thin edge of the flexible extension present the distinct possibility that the head will be pulled off the strip if too great a force is exerted on the bolt during the initial stages of tightening.

British Pat. No. 1,045,984, published Oct. 19, 1966, discloses a construction similar to that of U.S. Pat. No. 3,175,452, in which there is employed a thin extension which is threaded on its narrow edges. The British patent provides additional full circular sections at both ends of the narrow extension which overcome some of the disadvantages of the construction shown in U.S. Pat. No. 3,175,452. The construction shown in the British patent, however, requires an auxiliary threaded extension or bore at the end of the main bolt and a corresponding threaded hole or projection on the flexible extension, a complex construction which obviously increases the cost of the assembly.

Swedish Pat. No. 216,380, granted May 11, 1967, discloses a similar form of toggle employing a thin flexible member threaded on its narrow edges. The patent recognizes the problem of insuring a smooth transition from the threads of the flexible extension to those of the threaded shaft by providing a full circular section intermediate the threaded shaft and the flexible member, the circular section having undercut flexible threads which deform sufficiently under stress to permit engagement of a threaded head with the shaft, even if the respective threads do not exactly match. The complex construction of the transition zone of the fastener increases the cost of manufacturing the assembly.

British Pat. No. 606,902, accepted Aug. 23, 1948, discloses a fastener employing a solid internally threaded head mounted on a helical coil spring which can be bent to permit insertion of the head through a mounting hole. The coil serves as the only means for tightening the fastener, so that the problem of matching the threads to permit a smooth passage of the head from the coil spring to a rigid threaded shaft is not encountered. By the same token, the relatively weak spring used as the sole support member limits the load-carrying capacity of the assembly.

BRIEF DESCRIPTION OF THE DISCLOSURE

In accordance with the present invention, there is provided a toggle bolt assembly including a threaded bolt, the free end of which frictionally engages the bore of a coaxial helical coil spring with means for inhibiting relative rotation of the bolt and spring. The coils of the spring have an outer diameter and a pitch which correspond substantially to those of the threads of the bolt, so that the spring in essence forms a flexible extension of the threads of the bolt. The assembly also includes a solid head having an internally threaded hole adapted to engage the threads of the bolt as well as the coils of the spring. With the toggle head mounted on the spring near the free end thereof, the spring can easily be bent to position the toggle head adjacent the bolt and substantially parallel thereto, thus permitting the entire assembly to be passed through an opening in the member in which it is to be installed.

As soon as the toggle head has passed entirely through the hole, the resiliency of the spring causes it to straighten out, thus positioning the toggle head across the opening on the blind side of the hole. By maintaining the toggle head in contact with the rear surface of the member while rotating the bolt, the helical coils of the spring will guide the bolt into engagement with the toggle head, thus permitting the assembly to be tightened in conventional fashion.

In a preferred embodiment of the invention, one end of the elongated toggle head is provided with cutting means which permits the toggle head to be used to bore a hole of the apropriate size in the member in which the assembly is to be installed.

DESCRIPTION OF THE DRAWINGS

The invention will be better understood from the detailed description which follows, in conjunction with the accompanying drawings, in which:

FIG. 1 is an isometric view of a typical embodiment of the assembly of the invention, showing a solid toggle head mounted on a cylindrical coil spring attached to the end of a bolt;

FIG. 2 is an enlarged view in partial section of the toggle head, coil spring, and bolt of FIG. 1, showing the relationship among the toggle head, the spring, and the threads of the bolt;

FIG. 3 is a view illustrating the manner in which the toggle assembly is passed through an opening in a workpiece during installation of the toggle assembly;

FIG. 4 is a view showing the toggle assembly in a tightened condition;

DETAILED DESCRIPTION

Figure 5:
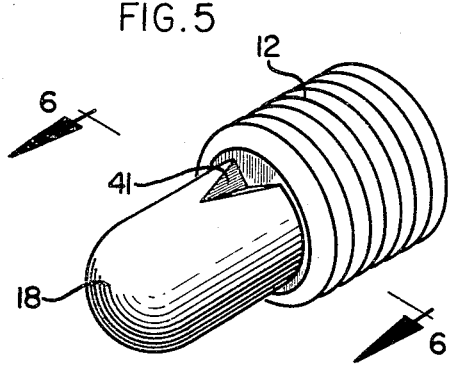
FIG. 5 is a partial isometric view of one embodiment of the invention, showing a triangular slot for inhibiting relative rotation of the bolt and spring.

As shown in the drawings, in a typical embodiment 10, the assembly of the invention comprises a bolt 11 having an elongated threaded shank 12 and an enlarged head 13 provided with conventional means such as slot 14 for rotating the bolt. At its other end, the bolt has attached thereto a cylindrical helical coil spring 16, formed of a suitable resilient material such as wire or plastic, which forms a coaxial extension of the bolt. Mounted on spring 16 is elongated toggle head 15, which is provided with a central threaded opening 22 which engages spring 16.

As shown in FIG. 2, spring 16 has an outer diameter which is approximately equal to that of the bolt, the coils 17 of the spring having a pitch which is substantially equal to that of the threads 21 on shank 12 and the same direction (right hand or left hand) of rotation as the threads.

Attachment of coil spring 16 to the end of bolt 11 is suitably made by providing the free end of the bolt with a short substantially cylindrical extension 18 of reduced diameter made in any appropriate manner. Extension 18 has a diameter which is slightly larger than the normal inner diameter of the coils 17 of spring 16, whereby on insertion of the extension into the bore of the spring, the coils are diametrically expanded sufficiently to produce a frictional engagement with extension 18 which is sufficient to prevent disengagement of the spring from the end of the bolt under all normal conditions encountered during installation of the assembly. In order to further increase the force necessary to separate spring 16 from bolt 11, it may be desirable to provide extension 18, at its point of juncture with the threads of the bolt, with an undercut channel 19 or the like which engages all or a portion of the first turn of the coil spring.

In FIG. 2, the enlargement of the diameter of spring 16 by engagement with extension 18 has been exaggerated for the sake of clarity. The actual increase in diameter of the coil spring is very small and practically insignificant. In effect, spring 16 has a substantially uniform diameter from one end to the other, including that portion which engages cylindrical extension 18. When assembled as shown in FIG. 2, the outer contour or crest of the coils 17 forms in effect an extension of the threads 21 on shank 12 which engages the threaded opening 22 in head 15. Thus, by relative rotation of toggle head 15 and bolt 11, toggle head 15 can be caused to move longitudinally along the bolt from the position shown in phantom outline in FIG. 2 to that shown in solid outline, at which point head 15 has traversed the length of cylindrical extension 18 and is beginning to engage the threads 21 of shank 12. Continued rotation of bolt 11 will cause additional movement of head 15 along shank 12 in conventional fashion.

Although extension 18 is desirably cylindrical as shown, it can also have a cross-section other than circular, e.g., triangular, square, or polygonal, provided that it frictionally engages spring 16 and holds the spring in a position generally coaxial with shank 12.

In a preferred embodiment, toggle head 15 has a contour which is generally rectangular, one of its narrow ends being provided with a cutting head 23 and the other end with an extension 24 adapted to be held in the chuck of a conventional drill, permitting the head 15 to be used in boring a hole of appropriate size for installation of the toggle bolt assembly.

In the above discussion, it has been assumed that the rotational orientation of spring 16 on extension 18 is such that the coils of the spring lie substantially on the same helix defined by threads 18, so that head 15 will encounter no resistance in passing from the spring 16 to shank 12. Although this orientation could be assured by inspection and individual adjustment of each assembly, such treatment is not commercially feasible at reasonable expense. In practice, spring 16 will be mounted by inserting extension 18 into the bore of the spring in a random manner, without any attempt to match the end of the spring with the end of the thread of shank 12. Under these circumstances, the proper thread match will be achieved only by accident, and in most cases there will be a rotational mismatch of as much as 180° between the end of spring 16 and the thread 21 of shank 12.

When such a mismatch exists, head 15 on reaching the joint between spring 15 and shank 12 will encounter an obstruction to further movement, such as that due to a stripped thread. Continued rotation of shank 12, in an effort to force head 15 to clear the obstruction may cause spring 16 to slip on extension 18, when the rotational force exerted on shank 12 exceeds the frictional engagement between spring 16 and extension 18.

In accordance with the invention, this potential difficulty in the operation of the assembly is overcome by providing cooperating means on the coil and the shank which interact to prevent or inhibit relative rotation between spring 16 and extension 18, including a detent in the surface of extension 18 which engages the end of spring 16, desirably bent inwardly so that it is resiliently biased into engagement with the detent.

The particular form of the detent is unimportant, provided only that it is effective to interlock the end of spring 16 relative to the surface of extension 18, so that rotation of bolt 11, in the direction of tightening the assembly, will also cause the spring to rotate rather than slip around the surface of extension 18.

Several specific embodiments of suitable detent means are illustrated in FIGS. 5–10.

Figure 6:
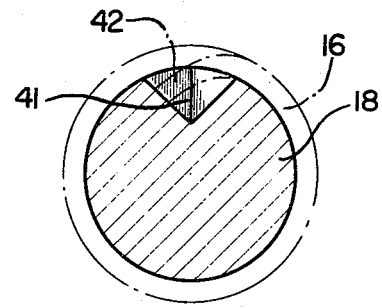
FIG. 6 is a cross-section along the line 6—6 of FIG. 5, showing the spring in phantom outline.
Figure 11:
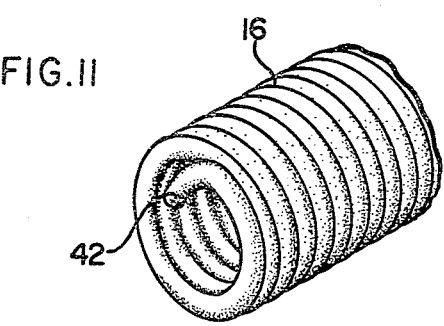
FIG. 11 is a partial isometric view of a spring used in the invention, showing the inwardly bent end thereof.

In FIG. 5, a tapering triangular notch 41 is provided in the surface of extension 18 adjacent the threaded end of shank 12. Notch 41 tapers in depth, increasing in a direction toward the head of bolt 11. As shown in FIG. 11, the free end 42 of spring 16 is desirably bent radially inwardly, but not to an extent which prevents the insertion of extension 18 into the bore of the spring. When the spring is mounted on the extension, the end 42 thereof is biased into notch 41, as shown in FIG. 6, thereby assuring that spring 16 and shank 18 will turn as a unit without slippage. The tapering depth of notch 41 tends to keep spring 16 in position adjacent the threads of shank 12, and at the same time tends to inhibit longitudinal disengagement. It will be obvious, however, that the form of notch 41 is not critical, and other shapes, e.g., rectangular or circular, of uniform or varying depth can also be used. Although only one such notch can be used, it is preferred to provide several, circumferentially spaced around the extension 18, so that little or no rotation of the spring on the extension will be required to permit end 42 of spring 16 to enter a notch.

Figure 7:
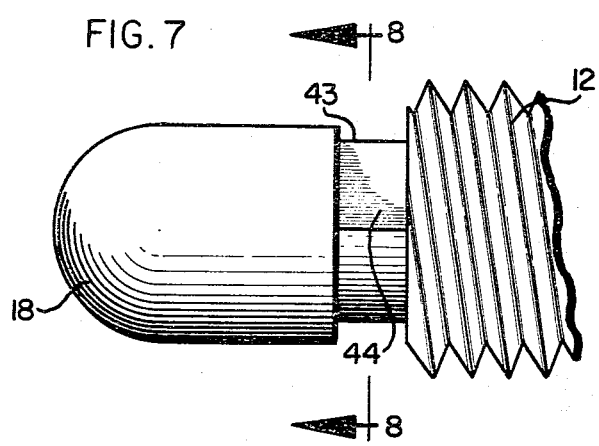
FIG. 7 is a partial side view of another embodiment, showing a notch for inhibiting rotation of the spring.
Figure 8:
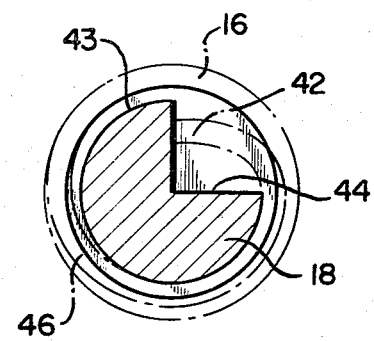
FIG. 8 is a cross-section along the line 8—8 of FIG. 7, showing the spring in phantom outline.
Figure 9:
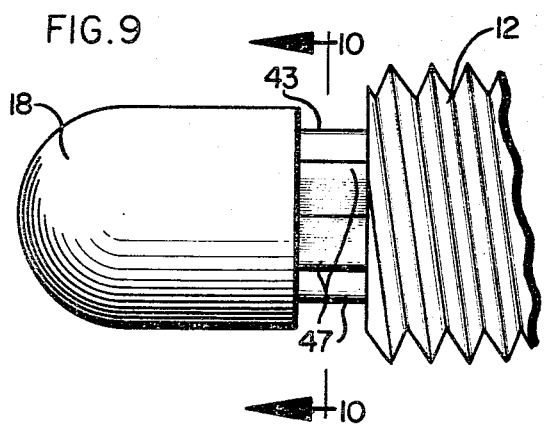
FIG. 9 is a partial side view of still another embodiment, showing knurls for inhibiting rotation of the spring.

Two other embodiments of suitable interlocking means is illustrated in FIGS. 7 and 9. In both embodiments, an undercut zone 43 adjacent the end of shank 12 is provided. In the embodiment of FIG. 7, a notch 44 is provided in the form of a quadrant of the cross-section of zone 43. As shown in FIG. 8, a portion 46 of the first turn of spring 16 engages zone 43 to inhibit longitudinal disengagement of the spring, while notch 44 engages the free end 42 of spring 16 to prevent rotation of the spring relative to extension 18.

Figure 10:
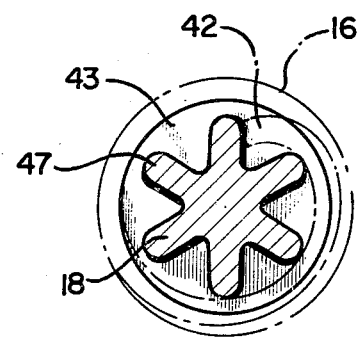
FIG. 10 is a cross-section along the line 10—10 of FIG. 9, showing the spring in phantom outline.

In the embodiment of FIGS. 9 and 10, zone 43 is knurled to provide a plurality of radially extending lugs 47 against any of which the free end 42 of coil 16 abuts, as shown in FIG. 10. The number and specific configuration of lugs 47 is not critical, provided only that such lugs adequately serve to inhibit rotation of spring 16 relative to extension 18.

For use of the invention, as an optional preliminary step toggle head 15 is used to drill a hole 26 through a wall or other surface 27 (FIG. 3), to which a workpiece 28 (also provided with a matching hole 26') is to be attached. Head 15 is then threaded on the end of spring 16 at a location which permits it to be folded to a position parallel to shank 12 of bolt 11, as shown in FIG. 3, allowing head 15, spring 16 and the end of bolt 11 to be passed through holes 26 and 26'. As soon as head 15 passes beyond the edge of hole 26, the natural resiliency of spring 16 causes it to straighten out to the position shown in phantom outline in FIG. 3, with head 15 spanning hole 26. In order to prevent possible engagement of the free end of extension 18 with the separated coils of spring 18 when bent for insertion, it is preferred that the end of extension 18 be chamfered or curved as shown, rather than terminating in a sharp edge. Bolt 11 is then withdrawn sufficiently to cause head 15 to contact the inner surface of wall 27, thus preventing head 15 from rotating as bolt 11 is rotated to bring bolt head 13 into firm contact with workpiece 28 to complete the assembly, as shown in FIG. 4. It is preferred to provide the surface of head 15 which contacts the wall with means (not shown), such as lugs or other projections, to prevent relative rotation between head 15 and wall 27 during installation of the assembly.

During the installation procedure, when toggle head 15 reaches the joint between spring 16 and the threaded end of shank 12 as a result of rotation of the bolt, increased resistance to turning will be encountered if, as will usually be the case, the coils of spring 16 do not form an extension of the helix defined by the threads 21 of shank 12. In the absence of locking means, such as the knurls 47 shown in FIG. 9, continued rotation of the bolt will merely cause spring 16 to slip or rotate about extension 18 without forcing head 15 to engage the threads of shank 12. The locking means provided in the invention, e.g., as shown in FIGS. 5, 7, or 9, however, prevents such slipping, and insures the continued application of a force tending to move the head into engagement with shank 12. Since the coils of spring 16 are not rigidly affixed to the surface of extension 18 but are in frictional contact therewith, the spring is free to move and deform as necessary under the force exerted thereon, until the threads of toggle head 15 engage those of shank 12.

Since the size of the hole drilled by head 15 is necessarily substantially larger than the diameter of shank 12, it is preferred to provide bolt head 14 with a centering plug 29 having a cylindrical section 31 of a diameter which permits it to enter hole 26' and a flange 32 of larger diameter which abuts the surface of workpiece 28 as shown. As will be evident to those skilled in the art, section 31 and flange 32 can be individual units, or they may be formed integrally with each other as well as with bolt head 13.

The foregoing detailed description has been given for clearness of understanding only, and no unnecessary limitations should be understood therefrom as modifications will be obvious to those skilled in the art.

What is claimed is:

1. A toggle bolt assembly comprising:
   a bolt having a threaded shank, a head attached to one end of said shank and a coaxial extension of reduced diameter attached to the other end thereof,
   an elongated resilient helical coil spring frictionally engaging said extension and projecting coaxially therefrom, the outer diameter of said spring being substantially equal to the diameter of said shank;
   the coils of said spring having a pitch substantially equal to that of the threads on said shank and the same direction of rotation, said spring and said shank being rotationally mismatched so that the coils of said spring do not form a continuation of the helix defined by said threads;

cooperating means on said spring and said extension for preventing relative rotation thereof in one direction;

a generally flat elongated toggle head having a threaded opening intermediate its ends adapted to threadedly engage said shank and said coil spring;

said spring being resiliently bendable sufficiently to permit said head to achieve a position adjacent and generally parallel to said shank when said head is positioned on said spring.

2. The assembly of claim 1 wherein said means includes a detent on said extension, which interacts with a free end of said coil.

3. The assembly of claim 2 wherein said free end is radially inwardly deformed, whereby it is resiliently biased into engagement with said detent.

4. The assembly of claim 2 wherein said detent comprises a plurality of longitudinal knurls spaced circumferentially about said extension.

5. The assembly of claim 2 wherein said detent comprises at least one undercut notch in the surface of said extension.

6. The assembly of claim 2 wherein said extension has a circumferentially undercut zone adjacent the threaded end of said shank, said undercut portion engaging at least a portion of one coil of said spring, whereby the resistance to longitudinal disengagement between said extension and said coil is increased.

* * * * *